United States Patent
Maor et al.

(10) Patent No.: US 10,685,204 B2
(45) Date of Patent: Jun. 16, 2020

(54) BIOMETRIC AGE ESTIMATION VIA ULTRASONIC IMAGING

(71) Applicant: QUALCOMM Incorporated, San Diego, CA (US)

(72) Inventors: Lior Maor, Petah Tikva (IL); Meir Agassy, Ramat Gan (IL); Boaz Castro, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 16/048,188

(22) Filed: Jul. 27, 2018

(65) Prior Publication Data
US 2020/0034593 A1  Jan. 30, 2020

(51) Int. Cl.
*G06K 9/00* (2006.01)
*G06F 21/32* (2013.01)

(52) U.S. Cl.
CPC ........... *G06K 9/0002* (2013.01); *G06F 21/32* (2013.01); *G06K 9/00087* (2013.01); *G06K 9/00899* (2013.01); *G06F 2221/2149* (2013.01); *G06K 2009/00932* (2013.01); *G06K 2009/00939* (2013.01)

(58) Field of Classification Search
None
See application file for complete search history.

(56) References Cited

U.S. PATENT DOCUMENTS

| | | | |
|---|---|---|---|
| 7,620,212 B1 * | 11/2009 | Allen | G06K 9/0004 340/5.53 |
| 9,582,705 B2 | 2/2017 | Du et al. | |
| 9,619,638 B2 | 4/2017 | Dow et al. | |
| 9,633,269 B2 | 4/2017 | Gu et al. | |
| 9,886,617 B2 * | 2/2018 | Rowe | G06K 9/00033 |
| 2002/0183624 A1 * | 12/2002 | Rowe | B82Y 20/00 600/476 |
| 2005/0185847 A1 * | 8/2005 | Rowe | G06K 9/00006 382/224 |
| 2007/0098235 A1 * | 5/2007 | Halavee | G06K 9/0008 382/124 |
| 2016/0063294 A1 * | 3/2016 | Du | G06K 9/0002 382/124 |
| 2016/0350573 A1 | 12/2016 | Kitchens, II et al. | |

* cited by examiner

*Primary Examiner* — Hadi Akhavannik
(74) *Attorney, Agent, or Firm* — Weaver Austin Villeneuve & Sampson LLP

(57) ABSTRACT

An apparatus may include an ultrasonic fingerprint sensor system and a control system. The control system may be configured for obtaining, via a scan of the fingerprint sensor system, current fingerprint image data from a surface of a target object, for extracting current fingerprint features from the current fingerprint image data and for determining whether the current fingerprint features match features of a previously-acquired fingerprint enrollment template. If there is a match, the control system may be configured for obtaining, via one or more additional scans of the fingerprint sensor system, current subsurface image data from a subsurface of the target object, for calculating an estimated biometric age of the target object, based at least in part on the current subsurface image data and for determining whether the estimated biometric age of the target object matches a previously-estimated biometric age.

30 Claims, 13 Drawing Sheets

BIOMETRIC AGE ESTIMATION VIA ULTRASONIC IMAGING

TECHNICAL FIELD

This disclosure relates generally to biometric devices and methods, including but not limited to ultrasonic sensor systems and methods for using such systems.

DESCRIPTION OF THE RELATED TECHNOLOGY

Technically savvy hackers revel in defeating the latest technical security innovations. For example, premium tier mobile phone manufacturers have had their first smartphones that incorporated fingerprint-based authentication systems successfully hacked shortly after product introduction. In addition to security and privacy issues associated with fingerprint spoofing, in some instances it is necessary (or at least desirable) to limit access, e.g., to a device, according to age. For example, it may be necessary (or at least desirable) to limit access to adult-themed content that should only be used by an adult and/or to a substance that should only be used by an adult.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include an ultrasonic fingerprint sensor system and a control system that is configured for communication with the ultrasonic fingerprint sensor system. In some examples, at least a portion of the control system may be coupled to the ultrasonic fingerprint sensor system. In some implementations, a mobile device may be, or may include, the apparatus. For example, a mobile device may include an apparatus as disclosed herein.

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured for obtaining, via a scan of the fingerprint sensor system, current fingerprint image data from a surface of a target object positioned on or near the fingerprint sensor system. The control system may be configured for extracting current fingerprint features from the current fingerprint image data. The control system may be configured for obtaining, from a memory system, a previously-acquired fingerprint enrollment template. The control system may be configured for determining whether the current fingerprint features match features of the previously-acquired fingerprint enrollment template. If the control system determines that the current fingerprint features do not match features of the previously-acquired fingerprint enrollment template, in some implementations the control system may be configured for terminating an authentication process.

However, if the control system determines that the current fingerprint features match features of the previously-acquired fingerprint enrollment template, the control system may be configured for performing one or more additional phases of an authentication process. For example, the control system may be configured for obtaining, via one or more additional scans of the fingerprint sensor system, current subsurface image data from a subsurface of the target object. The control system may be configured for calculating an estimated biometric age of the target object, based at least in part on the current subsurface image data, for obtaining, from the memory system, a previously-estimated biometric age and for determining whether the estimated biometric age of the target object matches the previously-estimated biometric age.

According to some examples, calculating the estimated biometric age may involve calculating finger size, fingerprint line density, heart rate, respiration rate and/or arterial stiffness. In some instances, calculating the estimated biometric age may involve calculating a time interval between a systolic peak and a diastolic peak. According to some implementations, calculating the estimated biometric age may involve calculating an arterial stiffness parameter. In some examples, calculating the estimated biometric age may involve calculating an estimated biometric age range. Alternatively, or additionally, calculating the estimated biometric age may involve calculating a composite score based on multiple parameters.

In some examples, calculating the estimated biometric age may involve calculating one or more arterial pulse waveform parameters. For example, calculating the estimated biometric age may involve calculating a second derivative of an arterial pulse waveform. In some such implementations, calculating the estimated biometric age may involve calculating a ratio of features that are determined from the second derivative of the arterial pulse waveform.

According to some implementations, the control system may be configured for controlling access to a device according to whether the current fingerprint features match features of the previously-acquired fingerprint enrollment template and whether the estimated biometric age of the target object matches the previously-estimated biometric age. Alternatively, or additionally, the control system may be configured for controlling access to at least one website or at least one software application according to whether the current fingerprint features match features of the previously-acquired fingerprint enrollment template and whether the estimated biometric age of the target object matches the previously-estimated biometric age.

Still other innovative aspects of the subject matter described in this disclosure can be implemented in an authentication method. The method may involve obtaining, via a scan of a fingerprint sensor system, current fingerprint image data from a surface of a target object positioned on or near the fingerprint sensor system and extracting current fingerprint features from the current fingerprint image data. The method may involve obtaining, from a memory system, a previously-acquired fingerprint enrollment template and determining (e.g., by a control system) whether the current fingerprint features match features of the previously-acquired fingerprint enrollment template. The authentication method may, in some examples, terminate if the current fingerprint features do not match features of the previously-acquired fingerprint enrollment template.

However, if the current fingerprint features match features of the previously-acquired fingerprint enrollment template, the method may involve initiating one or more additional authentication processes. According to some implementations, the method may involve obtaining, via one or more additional scans of the fingerprint sensor system, current subsurface image data from a subsurface of the target object and calculating an estimated biometric age of the target object, based at least in part on the current subsurface image data. The method may involve obtaining, from the memory system, a previously-estimated biometric age and determining whether the estimated biometric age of the target object matches the previously-estimated biometric age.

According to some examples, calculating the estimated biometric age may involve calculating finger size, fingerprint line density, heart rate, respiration rate and/or arterial stiffness. In some instances, calculating the estimated biometric age may involve calculating a time interval between a systolic peak and a diastolic peak. According to some implementations, calculating the estimated biometric age may involve calculating an arterial stiffness parameter. In some examples, calculating the estimated biometric age may involve calculating an estimated biometric age range. Alternatively, or additionally, calculating the estimated biometric age may involve calculating a composite score based on multiple parameters.

In some examples, calculating the estimated biometric age may involve calculating one or more arterial pulse waveform parameters. For example, calculating the estimated biometric age may involve calculating a second derivative of an arterial pulse waveform. In some such implementations, calculating the estimated biometric age may involve calculating a ratio of features that are determined from the second derivative of the arterial pulse waveform.

According to some implementations, the method may involve controlling access to a device according to whether the current fingerprint features match features of the previously-acquired fingerprint enrollment template and whether the estimated biometric age of the target object matches the previously-estimated biometric age. Alternatively, or additionally, the method may involve controlling access to at least one website or at least one software application according to whether the current fingerprint features match features of the previously-acquired fingerprint enrollment template and whether the estimated biometric age of the target object matches the previously-estimated biometric age.

Some or all of the operations, functions and/or methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

For example, the software may include instructions for controlling one or more devices to perform an authentication method. In some examples, the method may involve obtaining, via a scan of a fingerprint sensor system, current fingerprint image data from a surface of a target object positioned on or near the fingerprint sensor system and extracting current fingerprint features from the current fingerprint image data. The method may involve obtaining, from a memory system, a previously-acquired fingerprint enrollment template and determining (e.g., by a control system) whether the current fingerprint features match features of the previously-acquired fingerprint enrollment template. The authentication method may, in some examples, terminate if the current fingerprint features do not match features of the previously-acquired fingerprint enrollment template.

However, if the current fingerprint features match features of the previously-acquired fingerprint enrollment template, the method may involve initiating one or more additional authentication processes. According to some implementations, the method may involve obtaining, via one or more additional scans of the fingerprint sensor system, current subsurface image data from a subsurface of the target object and calculating an estimated biometric age of the target object, based at least in part on the current subsurface image data. The method may involve obtaining, from the memory system, a previously-estimated biometric age and determining whether the estimated biometric age of the target object matches the previously-estimated biometric age.

According to some examples, calculating the estimated biometric age may involve calculating finger size, fingerprint line density, heart rate, respiration rate and/or arterial stiffness. In some instances, calculating the estimated biometric age may involve calculating a time interval between a systolic peak and a diastolic peak. According to some implementations, calculating the estimated biometric age may involve calculating an arterial stiffness parameter. In some examples, calculating the estimated biometric age may involve calculating an estimated biometric age range. Alternatively, or additionally, calculating the estimated biometric age may involve calculating a composite score based on multiple parameters.

In some examples, calculating the estimated biometric age may involve calculating one or more arterial pulse waveform parameters. For example, calculating the estimated biometric age may involve calculating a second derivative of an arterial pulse waveform. In some such implementations, calculating the estimated biometric age may involve calculating a ratio of features that are determined from the second derivative of the arterial pulse waveform.

According to some implementations, the method may involve controlling access to a device according to whether the current fingerprint features match features of the previously-acquired fingerprint enrollment template and whether the estimated biometric age of the target object matches the previously-estimated biometric age. Alternatively, or additionally, the method may involve controlling access to at least one website or at least one software application according to whether the current fingerprint features match features of the previously-acquired fingerprint enrollment template and whether the estimated biometric age of the target object matches the previously-estimated biometric age.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system, such as an ultrasonic sensor system, as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Figure 1:
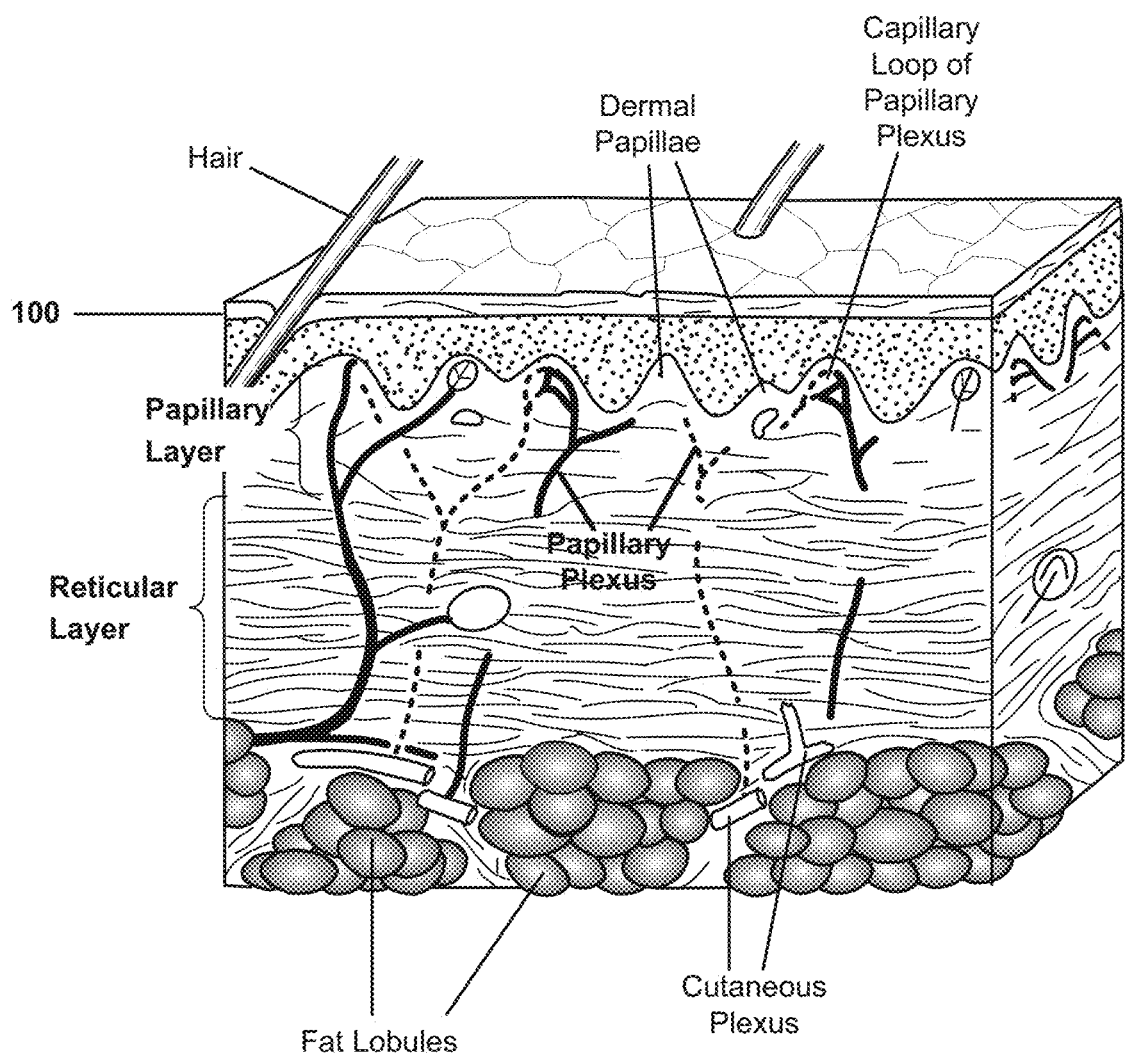
FIG. 1 shows examples of sub-epidermal features.

Some implementations may include an ultrasonic sensor system that is capable of obtaining image data from the epidermis, such as fingerprint image data, and image data that corresponds to sub-epidermal features. FIG. 1 shows examples of sub-epidermal features. As used herein, the term "sub-epidermal features" may refer to any of the tissue layers that underlie the epidermis 100, including the dermis, the papillary layer, the reticular layer, the subcutis, etc., and any blood vessels, lymph vessels, sweat glands, hair follicles, hair papilla, fat lobules, etc., that may be present within such tissue layers. Accordingly, sub-epidermal features also may include features not shown in FIG. 1, such as muscle tissue, bone material, etc. Because it may not be known in advance whether a target object actually includes skin or other human tissue, the term "subsurface image data" may be used herein to refer to image data that is obtained from below the surface (from a "subsurface") of a target object.

Some implementations may be capable of performing enrollment and authentication processes that are based, at least in part, on fingerprint image data, or on fingerprint minutiae or fingerprint image features such as keypoints derived from fingerprint image data. The term "fingerprint image data" is used herein to correspond to data from a surface of a target object positioned on or near the fingerprint sensor system, regardless of whether an actual fingerprint has been imaged. Some such processes also may be based on subsurface image data that has been obtained from a subsurface of the target object. Some such authentication processes may involve calculating an estimated biometric age of the target object, based at least in part on the current subsurface image data and determining whether the estimated biometric age of the target object matches a previously-estimated biometric age. In some examples, the estimated biometric age may be calculated upon determining that the currently-obtained fingerprint features match features of a previously-acquired fingerprint enrollment template.

Particular implementations of the subject matter described in this disclosure may be implemented to realize one or more of the following potential advantages. Some spoofing techniques are based on forming fingerprint-like features on an object, which may be a finger or a finger-like object. However, various disclosed implementations involve additional authentication processes, even after determining that currently-obtained fingerprint features match features of a previously-acquired fingerprint enrollment template. Also requiring a match between the estimated biometric age of the target object and a previously-estimated biometric age provides an additional layer of security. Controlling access to a device according to whether the current fingerprint features match features of the previously-acquired fingerprint enrollment template and whether the estimated biometric age of the target object matches the previously-estimated biometric age increases the likelihood that an unauthorized and/or underage person does not have access to adult-themed content, to a device that should only be used by an adult and/or to a substance that should only be used by an adult.

Figure 2:
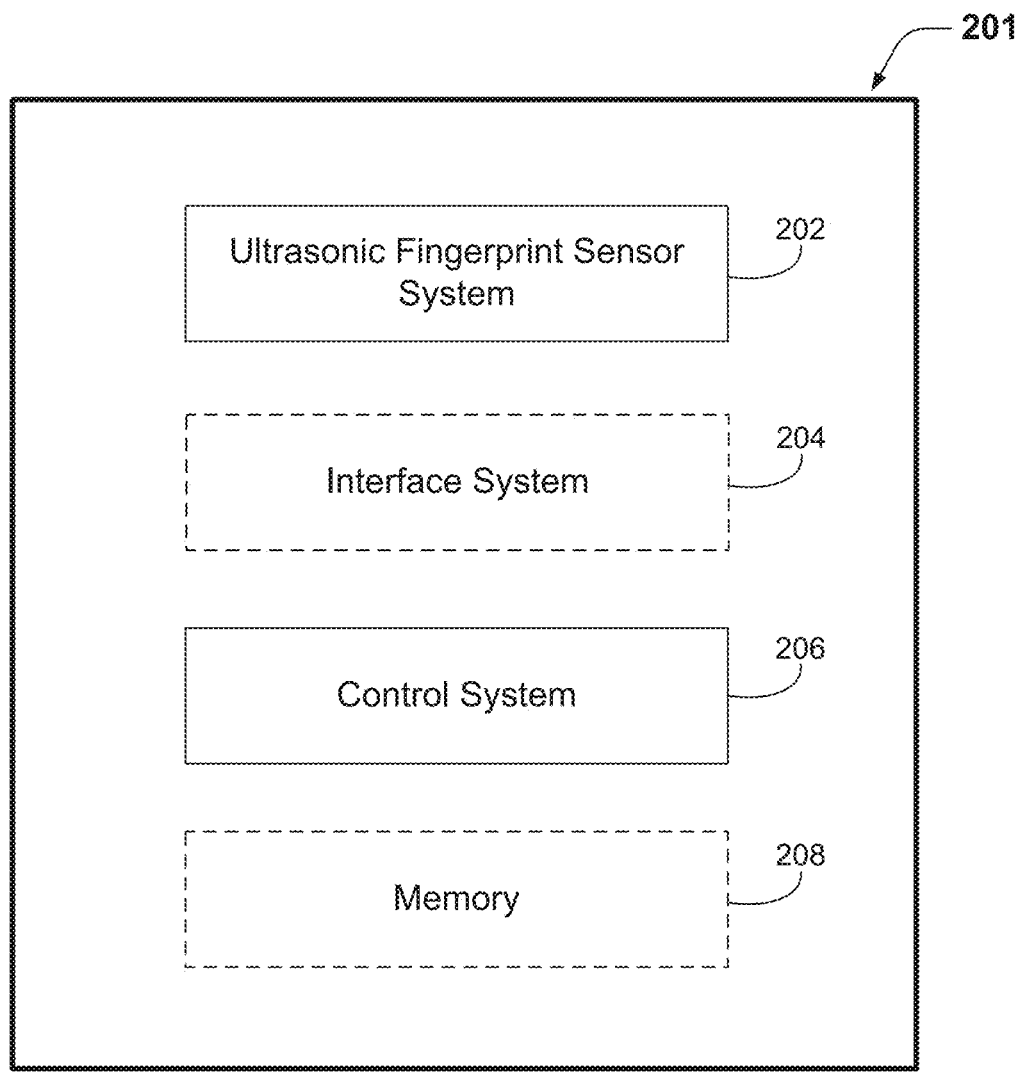
FIG. 2 is a block diagram that shows example components of an apparatus according to some disclosed implementations.

FIG. 2 is a block diagram that shows example components of an apparatus according to some disclosed implementations. In this example, the apparatus 201 includes an ultrasonic fingerprint sensor system 202 and a control system

206. Although not shown in FIG. 2, the apparatus 201 may include a substrate. Some examples are described below. Some implementations of the apparatus 201 may include an interface system 204. In some examples, the apparatus 201 may include a memory 208, in addition to any memory that the control system 206 may include.

Various examples of ultrasonic fingerprint sensor systems 202 are disclosed herein, some of which may include a separate ultrasonic transmitter and some of which may not. In some implementations the ultrasonic fingerprint sensor system 202 may be implemented via an ultrasonic transceiver array, whereas in alternative implementations the ultrasonic fingerprint sensor system 202 may be implemented via separate transmitter and receiver arrays. For example, in some implementations, the ultrasonic fingerprint sensor system 202 may include a piezoelectric receiver layer, such as a layer of PVDF polymer or a layer of PVDF-TrFE copolymer. In some implementations, a separate piezoelectric layer may serve as the ultrasonic transmitter. In some implementations, a single piezoelectric layer may serve as the transmitter and as a receiver. In some implementations, other piezoelectric materials may be used in the piezoelectric layer, such as aluminum nitride (AlN) or lead zirconate titanate (PZT). The ultrasonic fingerprint sensor system 202 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers. According to some alternative examples, the ultrasonic fingerprint sensor system 202 may be an ultrasonic receiver array and the ultrasonic transmitter may include one or more separate elements. In some such examples, the ultrasonic transmitter may include an ultrasonic plane-wave generator, such as those described below.

The control system 206 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 206 also may include (and/or be configured for communication with) one or more memory devices, such as one or more random access memory (RAM) devices, read-only memory (ROM) devices, etc. Accordingly, the apparatus 201 may have a memory system that includes one or more memory devices, though the memory system 208 is shown as an optional element in FIG. 2. The control system 206 may be capable of receiving and processing data from the ultrasonic fingerprint sensor system 202, e.g., as described below. In some implementations, functionality of the control system 206 may be partitioned between one or more controllers or processors, such as a dedicated sensor controller and an applications processor of a mobile device.

Some implementations of the apparatus 201 may include an interface system 204. In some examples, the interface system 204 may include a wireless interface system. In some implementations, the interface system 204 may include a user interface system, one or more network interfaces, one or more interfaces between the control system 206 and the optional memory system 208, one or more interfaces between the control system 206 and the ultrasonic fingerprint sensor system 202 and/or one or more interfaces between the control system 206 and one or more external device interfaces (e.g., ports or applications processors).

The interface system 204 may be configured to provide communication (which may include wired or wireless communication, such as electrical communication, radio communication, etc.) between components of the apparatus 201. In some such examples, the interface system 204 may be configured to provide communication between the control system 206 and the ultrasonic fingerprint sensor system 202. According to some such examples, a portion of the interface system 204 may couple at least a portion of the control system 206 to the ultrasonic fingerprint sensor system 202, e.g., via electrically conducting material. According to some examples, the interface system 204 may be configured to provide communication between the apparatus 201 and other devices and/or human beings. In some such examples, the interface system 204 may include one or more user interfaces. The interface system 204 may, in some examples, include one or more network interfaces and/or one or more external device interfaces (such as one or more universal serial bus (USB) interfaces).

The apparatus 201 may be used in a variety of different contexts, some examples of which are disclosed herein. For example, in some implementations a mobile device may include at least a portion of the apparatus 201. In other examples, at least a portion of the apparatus 201 may be included in a door handle, an automobile, a medicine cabinet, etc. In some implementations, a wearable device may include at least a portion of the apparatus 201. The wearable device may, for example, be a bracelet, an armband, a wristband, a ring, a headband or a patch. In some implementations, the control system 206 may reside in more than one device. For example, a portion of the control system 206 may reside in a wearable device and another portion of the control system 206 may reside in another device, such as a mobile device (e.g., a smartphone or a tablet computer). The interface system 204 also may, in some such examples, reside in more than one device.

Figure 3:
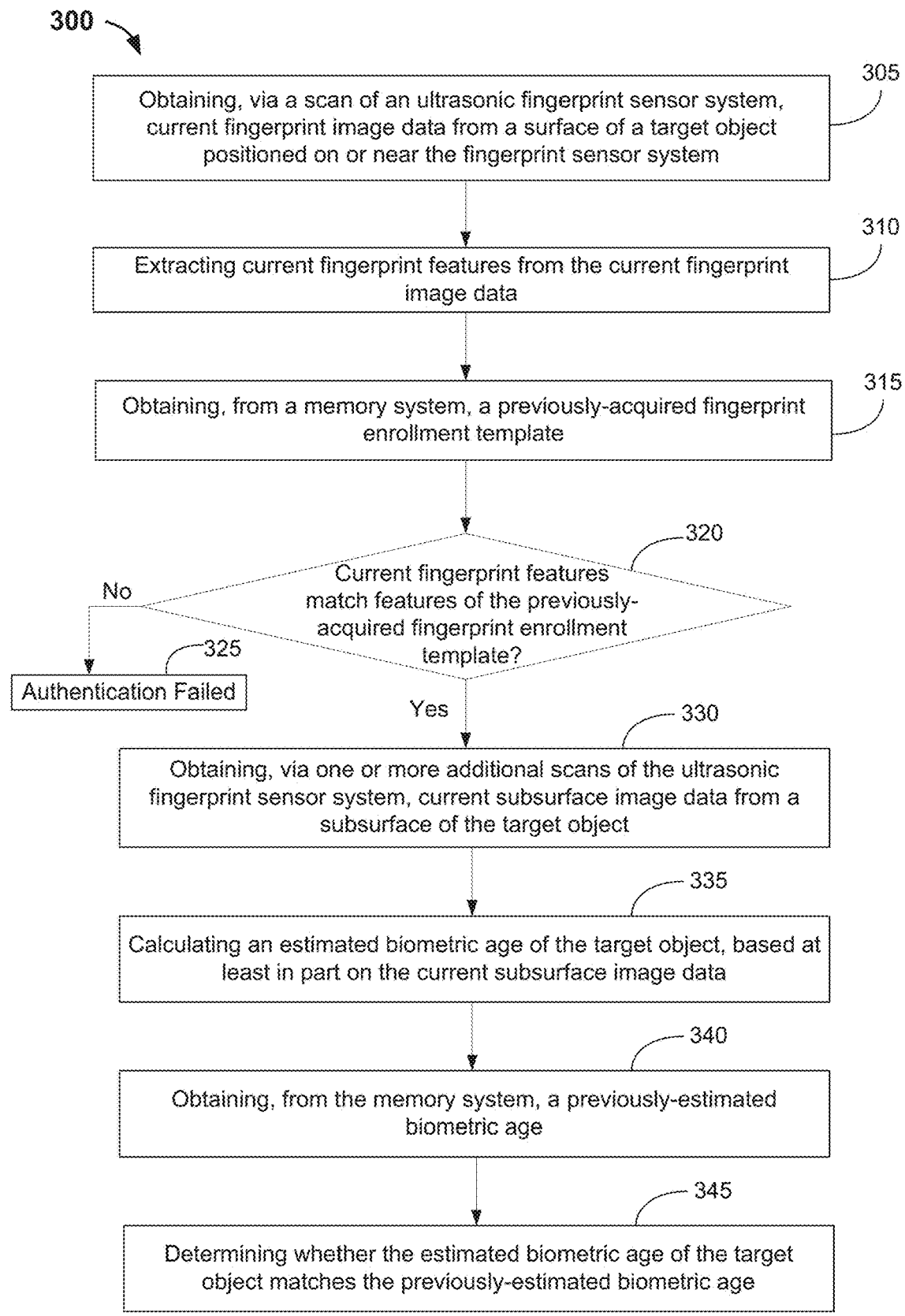
FIG. 3 is a flow diagram that shows blocks of an authentication method according to one example.

FIG. 3 is a flow diagram that shows blocks of an authentication method according to one example. The method 300 may, for example, be implemented at least in part by a control system (such as the control system 206) that includes one or more processors and one or more non-transitory memory devices. As with other disclosed methods, the blocks of method 300 are not necessarily performed in the order shown in FIG. 3. Moreover, alternative methods may include more or fewer blocks.

According to this example, block 305 involves obtaining, via a scan of a fingerprint sensor system, current fingerprint image data from a surface of a target object positioned on or near the fingerprint sensor system.

In some instances, the target object may be a digit, such as a finger. The term "finger" may be used herein to refer to any digit, including a thumb. Accordingly, a "fingerprint" as used herein may refer to a print from a finger or to a thumbprint. However, in some instances the target object may be a finger-like object. In other examples, the target object may be digit having a sleeve placed thereon. The sleeve may include a fingerprint of another person. The term "fingerprint image data" will be used herein to refer to image data obtained from a surface of a target object, regardless of whether the target object is a finger, a finger with a sleeve on it or a non-finger object.

In this implementation, the fingerprint sensor system is an ultrasonic fingerprint sensor system. There are potential advantages to using an ultrasonic fingerprint sensor system instead of, or in addition to, another type of fingerprint sensor system. For example, an ultrasonic fingerprint sensor system may be capable of obtaining fingerprint image data even when there is a layer of optically opaque material between the ultrasonic fingerprint sensor system and a target object. Some ultrasonic fingerprint sensor systems are capable of obtaining fingerprint image data even when the ultrasonic fingerprint sensor system is positioned behind a display and the target object is positioned on or near the front of the display. Some ultrasonic fingerprint sensor systems are capable of obtaining subsurface image data, which may include sub-epidermal image data, from relatively deeper within a target object than the maximum imaging depth of other types of fingerprint sensors. However, in some alternative implementations the fingerprint sensor system may be, or may include, another type of fingerprint sensor system, such as an optically-based fingerprint sensor system.

In this implementation, block 310 involves extracting current fingerprint features from the current fingerprint image data. According to some such examples, the fingerprint features may include minutiae or keypoint information. Here, block 315 involves obtaining, from a memory system, a previously-acquired fingerprint enrollment template and block 320 involves determining whether the current fingerprint features match features of the previously-acquired fingerprint enrollment template.

Accordingly, in this example a user authentication process involves comparing "fingerprint features" obtained from received fingerprint image data, based on the signals from an ultrasonic fingerprint sensor system, with features of a previously-acquired fingerprint enrollment template. The fingerprint enrollment template may have been obtained from fingerprint image data that was previously received from an authorized user during an enrollment process. Accordingly, a user authentication process based on features of fingerprint image data may be based, at least in part, on comparing received and stored fingerprint template data. However, such a process may or may not involve directly comparing received and stored fingerprint image data, depending on the particular implementation.

In the example shown in FIG. 3, if it is determined in block 320 that the current fingerprint features do not match features of the previously-acquired fingerprint enrollment template, the authentication process fails (block 325). However, if it is determined in block 320 that the current fingerprint features do match features of the previously-acquired fingerprint enrollment template, the authentication process continues to block 330, which involves obtaining, via one or more additional scans of the ultrasonic fingerprint sensor system, current subsurface image data from a sub-surface of the target object.

Subsurface image data may include information regarding the attributes of blood vessels, such as information regarding the types and locations of blood vessel features, which may include blood vessel size, blood vessel orientation, the locations of blood vessel branch points, blood vessel expansion and/or contraction, the movement of blood in blood vessels, etc. Alternatively, or additionally, biometric template data corresponding to sub-epidermal features may include attribute information regarding the types (e.g., the sizes, shapes, orientations, etc.) and locations of features of the dermis, features of the sub-cutis, lymph vessel features, sweat gland features, hair follicle features, hair papilla features, fat lobule features, muscle tissue and/or bone material.

In some examples, block 330 may involve obtaining, via one or more additional scans of the ultrasonic fingerprint sensor system, current image data from a surface of the target object. For example, block 330 may involve obtaining image data from which a finger size may be determined or estimated.

In this example, block 335 involves calculating an estimated biometric age of the target object, based at least in part on the current subsurface image data. In some examples, block 335 may involve calculating the estimated biometric age based on finger size, fingerprint line density, heart rate, respiration rate and/or arterial stiffness. According to some examples, block 335 may involve analyzing fingerprint image data in the image domain, e.g., to estimate finger size. Alternative, or additionally, block 335 may involve analyzing fingerprint image data in the spatial frequency domain to calculate fingerprint line density, such as LPMM (lines per mm) density. Smaller fingers and the fingers of relatively younger people tend to contain relatively higher LPMMs than those of older and/or larger people.

Features extracted from the subsurface image data may be used for estimating physiologic metrics such as heart rate, respiration rate, the distance between the systolic and diastolic peaks of an arterial pulse waveform, etc. These physiologic metrics may be used to estimate a biometric age. For example, heart rate and respiration rate generally decrease with age. In some examples, features extracted from the subsurface image data may be analyzed in the frequency domain.

Alternatively, or additionally, block 335 may involve calculating the estimated biometric age based on one or more arterial pulse waveform parameters. Relevant devices and methods for using ultrasonic devices to estimate blood pressure, blood flow parameters and other cardiovascular properties are disclosed in United States Patent Publication No. 2017/0231578, entitled "METHODS AND DEVICES FOR CALCULATING BLOOD PRESSURE BASED ON MEASUREMENTS OF ARTERIAL BLOOD FLOW AND ARTERIAL LUMEN," and in United States Patent Publication No. 2017/0231598, entitled "ULTRASOUND DEVICES FOR ESTIMATING BLOOD PRESSURE AND OTHER CARDIOVASCULAR PROPERTIES," both of which are hereby incorporated by reference.

Figure 4:
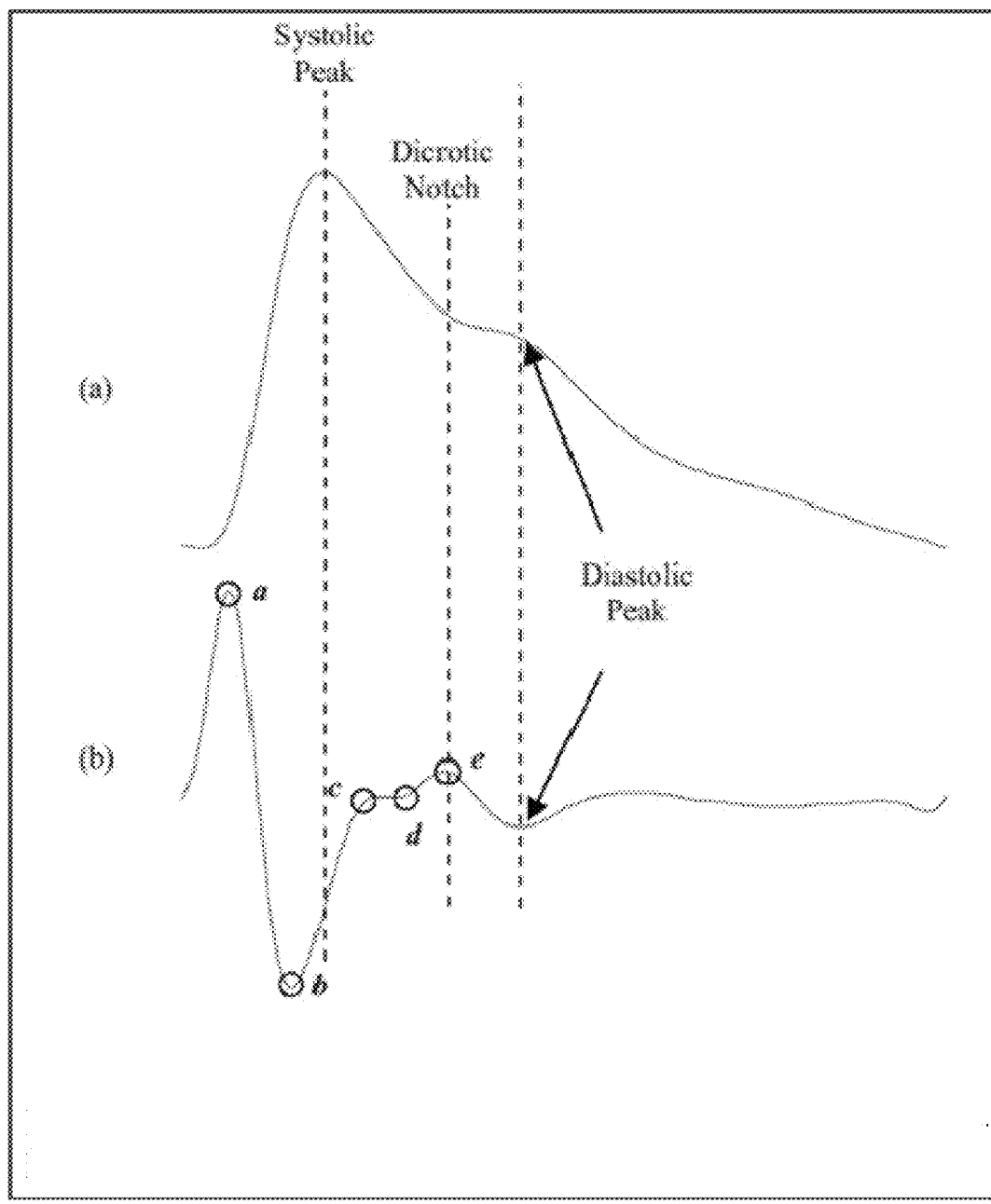
FIG. 4 shows features of an arterial pulse waveform according to one example.

FIG. 4 shows features of an arterial pulse waveform according to one example. Part (a) of FIG. 1 shows features of an arterial pulse waveform in the time domain, measured from a person's finger via a fingerprint sensor. Part (b) of FIG. 4 shows a second derivative of the arterial pulse waveform of part (a), as well as features a-e that are observable from the second derivative of the arterial pulse waveform. The features a-e may be used to estimate a biometric age. For example, the ratios b/a, (b−c−d−e)/a and (c+d+b)/a tend to increase with age, whereas the ratios c/a, d/a and e/a tend to decrease with age.

Accordingly, in some implementations calculating an estimated biometric age may involve calculating a second derivative of an arterial pulse waveform. In some such implementations, calculating the estimated biometric age may involve calculating a ratio of features that are determined from the second derivative of the arterial pulse waveform.

Figure 5:
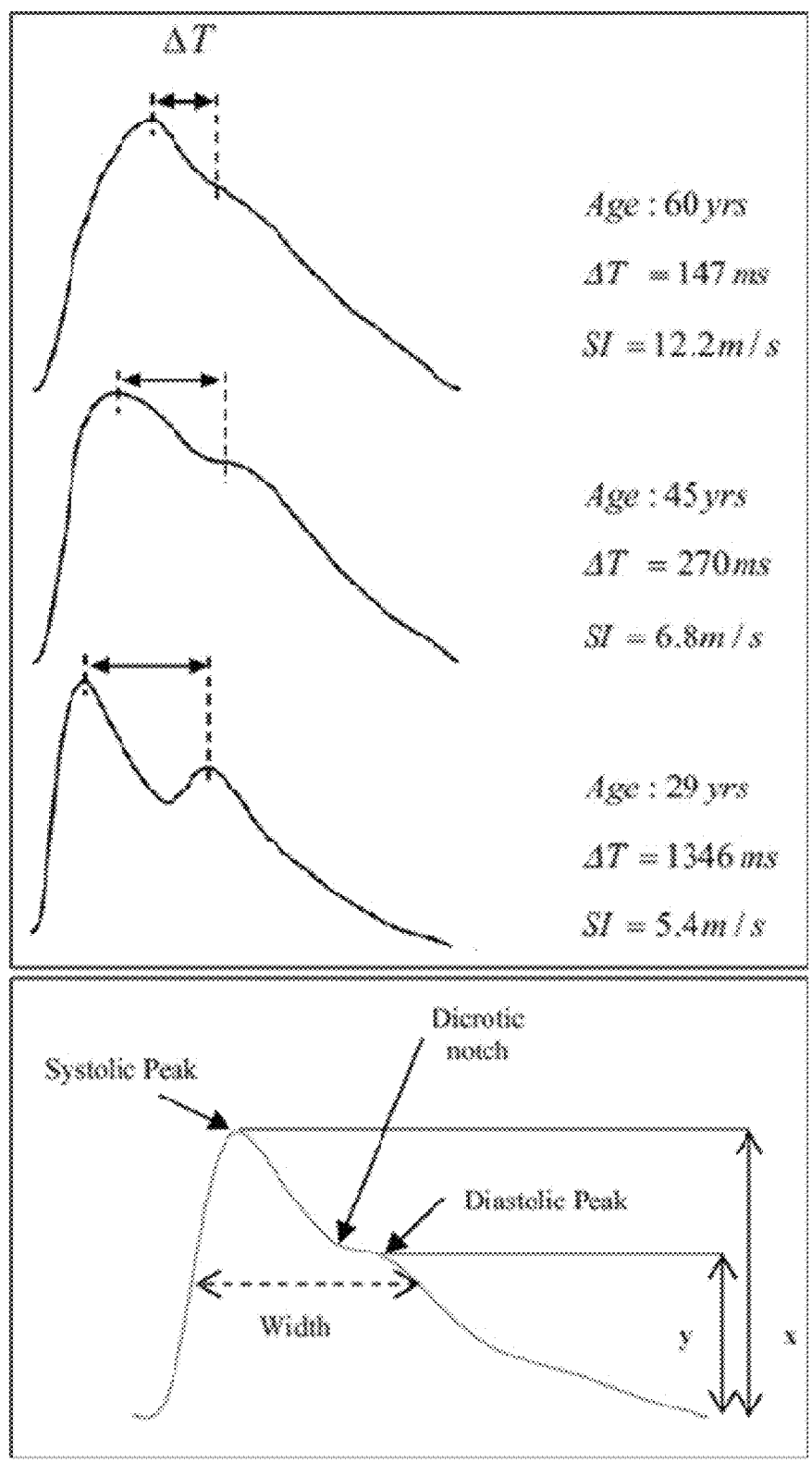
FIG. 5 shows several additional examples of arterial pulse waveforms in the time domain.

FIG. 5 shows several additional examples of arterial pulse waveforms in the time domain. The lower window of FIG. 5 shows an example of an arterial pulse waveform in which the systolic peak, the diastolic peak, the width, the dicrotic notch, x and y are labeled. These and other features may be used for estimating biometric age. For example, as shown in the upper window of FIG. 5, the systolic-diastolic peak distance ΔT tends to decrease with age. On the other hand, as shown in the upper window of FIG. 5, arterial stiffness (represented as SI in FIG. 5) tends to increase with age. SI may be calculated, or estimated, as $$\frac{\text{height}}{\Delta T}.$$

"Height" may be determined as x-y in this example.

Accordingly, in some examples block 335 may involve calculating the estimated biometric age based, at least in part, on a time interval between a systolic peak and a diastolic peak. According to some examples, block 335 may involve calculating the estimated biometric age based, at least in part, on a difference in height between a systolic peak and a diastolic peak.

According to some examples, calculating the estimated biometric age may involve calculating an estimated biometric age range. Referring again to FIG. 5, the lowest arterial pulse waveform in the upper window corresponds to a 29-year-old person. According to some examples, the same values of $\Delta T$ and SI may be deemed to correspond to an estimated biometric age range of 28-30 years, of 27-31 years, of 26-32 years, of 25-33 years, or to another estimated biometric age range.

In some examples, calculating the estimated biometric age, and/or the estimated biometric age range, may involve calculating a composite score based on multiple parameters. In the foregoing example, the values of $\Delta T$ and SI may both be used for calculating an estimated biometric age and/or an estimated biometric age range. In one such example, each value may be used to make a separate estimation of biometric age and the two estimated biometric ages may be averaged.

In some examples, estimating a biometric age range may involve making a separate estimation of biometric age based on each of multiple parameters and estimating the biometric age range according to the highest and lowest estimated biometric ages. For example, if the estimated biometric age based on $\Delta T$ is 40 years, the estimated biometric age based on SI is 45 years, the estimated biometric age based on the ratio c/a is 42 years and the estimated biometric age based on the ratio d/a is 46 years, in some implementations the biometric age range may be estimated as 40-46 years.

However, in some implementations, a set of estimated biometric ages may be made based on each of multiple parameters. In the foregoing example, a data structure may be stored that indicates that the estimated biometric age based on $\Delta T$ is 40 years, the estimated biometric age based on SI is 45 years, the estimated biometric age based on the ratio c/a, is 42 years and the estimated biometric age based on the ratio d/a is 46 years.

In other examples, a weighting function may be used to bias the calculation of estimated biometric age, and/or the estimated biometric age range, such that more reliable metrics are given increased weight. For example, as described above with reference to FIG. 4, some methods of estimating biometric age involve determining ratios of values obtained by taking the second derivative of an arterial waveform.

Figure 6:
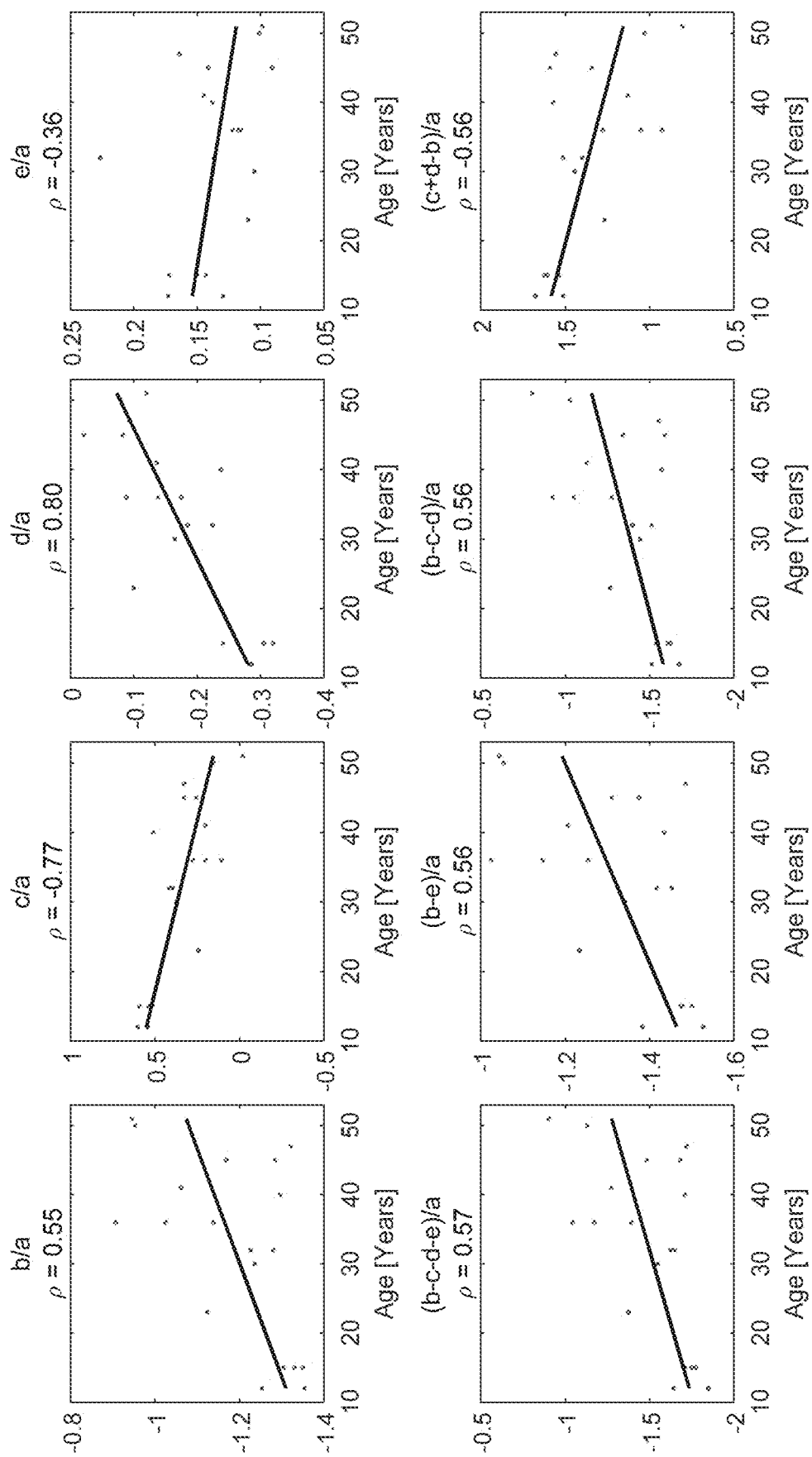
FIG. 6 shows graphs that indicate correlations between actual chronological ages and estimated biometric ages.

FIG. 6 shows graphs that indicate correlations between actual chronological ages and estimated biometric ages. In these examples, the estimated biometric ages are based on various ratios of values obtained by taking the second derivative of an arterial waveform. Each graph indicates a corresponding value of ρ, which is a correlation coefficient. The higher the value of ρ, the stronger the correlation between actual chronological ages and estimated biometric ages. Based in part on the data shown in FIG. 6, the inventors have determined that some such ratios (such as the ratios c/a and d/a) are more likely than others to provide an estimated biometric age that corresponds with a chronological age of a subject.

Accordingly, in some disclosed examples a weighting function may be used to bias the calculation of estimated biometric age, and/or the estimated biometric age range, such that one or both of these metrics (and/or one or more other metrics) are given increased weight. In some such examples, the ratios c/a and d/a may be given two or three times the weighting of estimated biometric ages based on other ratios.

Returning to the example shown in FIG. 3, block 340 involves obtaining, from the memory system, a previously-estimated biometric age. The previously-estimated biometric age may, in some examples, have been obtained by a process like that of block 335. According to this example, block 345 involves determining whether the estimated biometric age of the target object matches the previously-estimated biometric age. If so, in some examples the authentication process will conclude successfully.

Some such examples may involve controlling access to a device according to whether the current fingerprint features match features of the previously-acquired fingerprint enrollment template and whether the estimated biometric age of the target object matches the previously-estimated biometric age. The device may, for example, be a smart phone or other mobile device, an automobile, a medicine cabinet, a hot water dispenser, etc. If both stages of the authentication process conclude successfully, access to the device may be granted. Alternative implementations may involve controlling access to at least one website or at least one software application according to whether both stages of the authentication process conclude successfully.

Figures 7A, 7B, 7C:
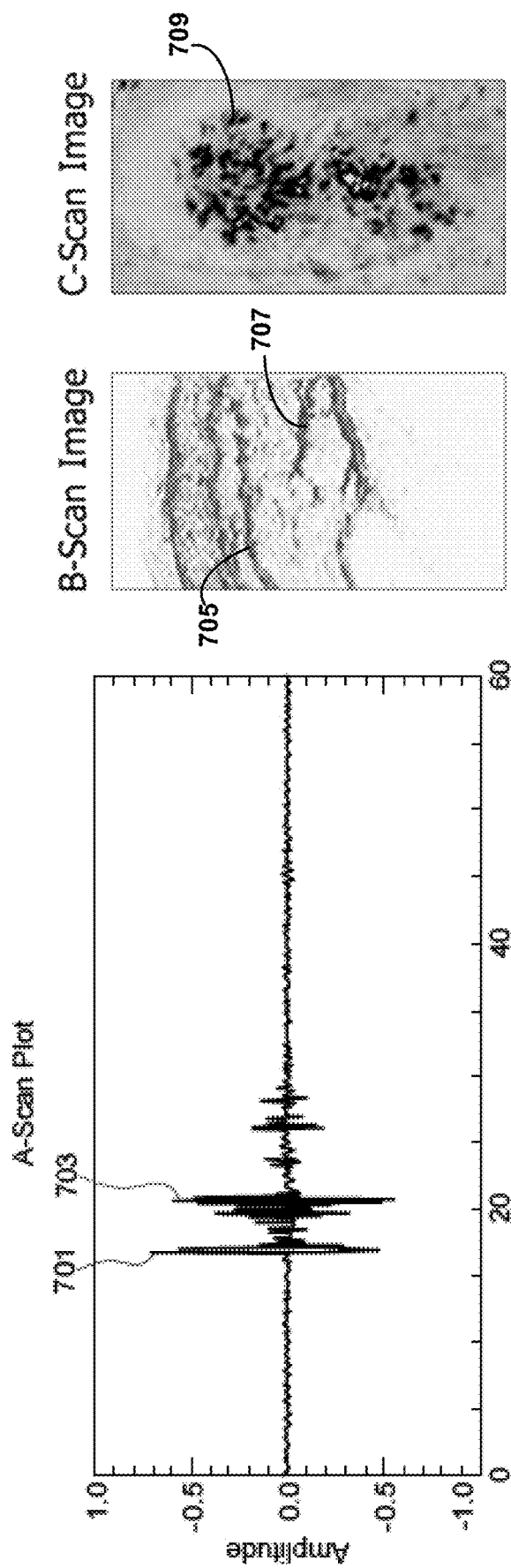
FIGS. 7A-7C show examples of A-scan, B-scan and C-scan images.

FIGS. 7A-7C show examples of A-scan, B-scan and C-scan images. As shown in FIG. 7A, an A-scan plot of reflection amplitude versus time may be obtained from a single ultrasonic receiver or transceiver, such as a sensor pixel or a small group of sensor pixels. The high-amplitude events shown in FIG. 7A indicate reflections from within a target object, such as a finger, caused by acoustic impedance contrast within the target object. The surface of a bone, for example, generally has a relatively high acoustic impedance contrast with the overlying tissue and therefore produces a relatively high-amplitude reflection. The presence of multiple reflections in an A-scan, such as the reflections 701 and 703 shown in FIG. 7A, indicates that the target object is not, for example, air or a solid piece of silicone rubber or other such material that may be used for spoofing. The presence of such reflections, in conjunction with a fingerprint match, would suggest that the target object is actually a finger of an authorized user. However, a fake finger could be made with multiple layers having different acoustic impedances. Moreover, a fingerprint pattern of a rightful user on a sleeve slipped over or placed on a hacker's finger could defeat such a simple anti-spoofing method.

A B-scan image, such as that shown in FIG. 7B, may be obtained from a single row or column of ultrasonic receivers or transceivers. In this example, travel time is along the vertical axis of the B-scan image. Various reflections, including reflections 705 and 707, may be seen in the B-scan image of FIG. 7B. The reflections 705 and 707 correspond to sub-epidermal features of a finger in this example. The presence of such complex features provides a stronger indication that the target object is actually a finger, as compared with A-scan image data.

A C-scan image may be obtained from an array of ultrasonic receivers or transceivers, such as a grid of ultrasonic receivers or transceivers or a focused single-element transceiver with arcuate and translational mechanical motion capability. In the example shown in FIG. 7C, ultrasonic image data has been obtained at a depth suitable for obtaining a 2-D C-scan image of sub-epidermal features, such as the feature 709 that corresponds to a region of elevated acoustic impedance contrast, such as sub-epidermal vasculature or aggregates of fatty tissue. The depth may correspond with a selected time interval between the time ultrasound is transmitted and the time during which reflected ultrasonic waves are sampled (which may be referred to herein as the acquisition time delay or the range-gate delay (RGD)). For example, a relatively larger range-gate delay may be selected to receive reflected ultrasonic waves primarily from bones and a relatively smaller range-gate delay may be selected to receive reflected ultrasonic waves primarily from ridges and valleys of a fingerprint or subepidermal features such as blood vessels, blood, muscle tissue features or bone tissue features.

The amount of detail in the C-scan image provides yet stronger indications that the target object is actually a finger. Moreover, sub-epidermal features are indicated in sufficient detail such that their corresponding attribute information may be used as part of an authentication process, such as distinctive C-scan features referenced in depth and offset with respect to one or more fingerprint minutiae of a rightful user's finger.

Figure 8:
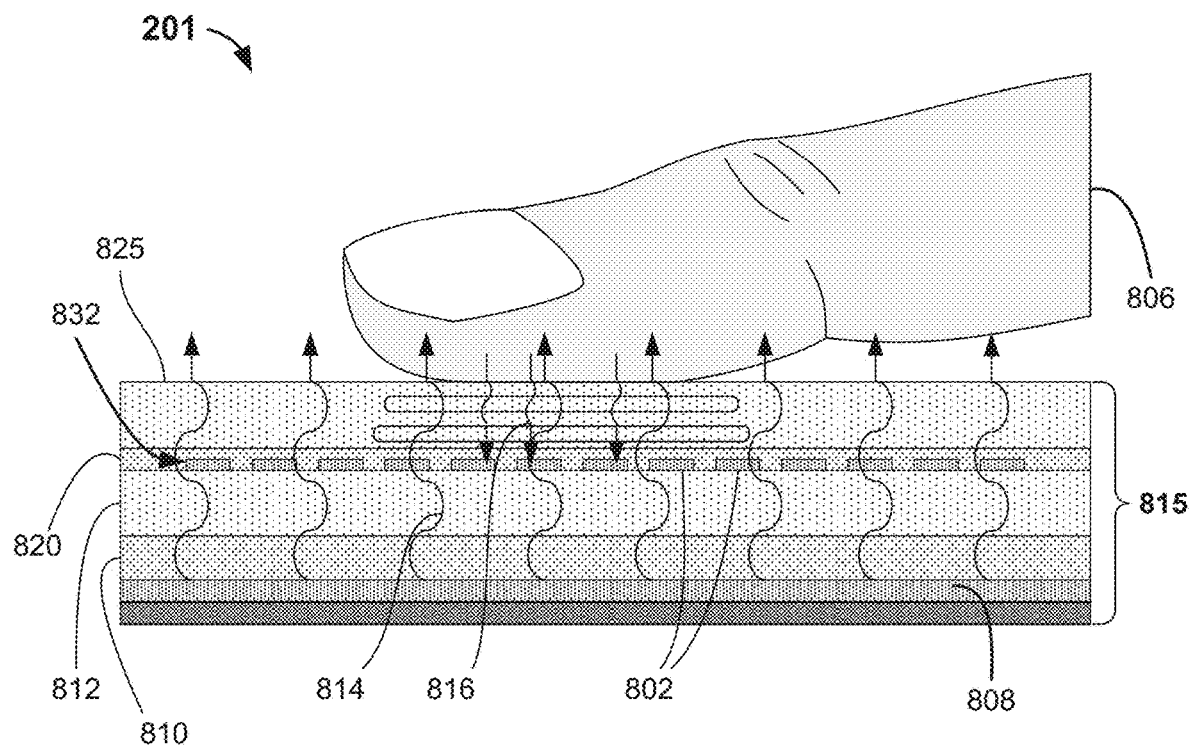
FIG. 8 shows an example of a cross-sectional view of an apparatus capable of performing at least some methods that are described herein.

FIG. 8 shows an example of a cross-sectional view of an apparatus capable of performing at least some methods that are described herein. For example, the apparatus 201 may be capable of performing, at least in part, the methods that are described herein with reference to FIGS. 2 and 3. The apparatus 201 is an example of a device that may be included in a biometric system such as those disclosed herein. Here, the apparatus 201 is an example of the apparatus 201 that is described above with reference to FIG. 2. As with other implementations shown and described herein, the types of elements, the arrangement of the elements and the dimensions of the elements illustrated in FIG. 8 are merely shown by way of example.

FIG. 8 shows an example of ultrasonic waves reflecting from a target object. In this example, the target object is a finger 806 being insonified by transmitted ultrasonic waves 814. Here, the reflected ultrasonic waves 816 are received by at least a portion of the ultrasonic sensor array 832.

In this example, the ultrasonic waves are transmitted by an ultrasonic transmitter 808 that is separate from the ultrasonic sensor array 832. In the example shown in FIG. 8, at least a portion of the apparatus 201 includes an ultrasonic transmitter 808 that may function as a plane-wave ultrasonic transmitter. In some implementations, the ultrasonic transmitter 808 may include a piezoelectric transmitter layer with transmitter excitation electrodes disposed on each side of the piezoelectric transmitter layer.

In this example, the ultrasonic sensor array 832 may function as an ultrasonic receiver array. In some such examples, the ultrasonic sensor array 832 may include an array of pixel input electrodes and sensor pixels formed in part from TFT circuitry, an overlying piezoelectric receiver layer 820 of piezoelectric material such as PVDF or PVDF-TrFE, and an upper electrode layer positioned on the piezoelectric receiver layer, which will sometimes be referred to herein as a receiver bias electrode. Examples of suitable ultrasonic transmitters and ultrasonic receiver arrays are described below with reference to FIGS. 12A and 12B.

However, in alternative implementations, the ultrasonic sensor array 832 and the ultrasonic transmitter 808 may be combined in an ultrasonic transceiver array. For example, in some implementations, the ultrasonic sensor array 832 may include a piezoelectric receiver layer, such as a layer of PVDF polymer or a layer of PVDF-TrFE copolymer. In some implementations, a separate piezoelectric layer may serve as the ultrasonic transmitter. In some examples, a single piezoelectric layer may serve as the transmitter and as a receiver. In some implementations, other piezoelectric materials may be used in the piezoelectric layer, such as aluminum nitride (AlN) or lead zirconate titanate (PZT). The ultrasonic sensor array 832 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers.

In this example, the transmitted ultrasonic waves 814 have been transmitted from the ultrasonic transmitter 808 through a sensor stack 815 and into an overlying finger 806. The various layers of the sensor stack 815 may, in some examples, include one or more substrates of glass or other material (such as plastic or sapphire) that is substantially transparent to visible light. In this example, the sensor stack 815 includes a substrate 810 to which a light source system (not shown) is coupled, which may be a backlight of a display according to some implementations. In alternative implementations, a light source system may be coupled to a front light. Accordingly, in some implementations a light source system may be configured for illuminating a display and the target object.

In this implementation, the substrate 810 is coupled to a thin-film transistor (TFT) substrate 812 for the ultrasonic sensor array 832. According to this example, a piezoelectric receiver layer 820 overlies the sensor pixels 802 of the ultrasonic sensor array 832 and a platen 825 overlies the piezoelectric receiver layer 820. Accordingly, in this example the apparatus 201 is capable of transmitting the ultrasonic waves 814 through one or more substrates of the sensor stack 815 that include the ultrasonic sensor array 832 with substrate 812 and the platen 825 that may also be viewed as a substrate. In some implementations, sensor pixels 802 of the ultrasonic sensor array 832 may be transparent, partially transparent or substantially transparent, such that the apparatus 201 may be capable of transmitting light from a light source system through elements of the ultrasonic sensor array 832. In some implementations, the ultrasonic sensor array 832 and associated circuitry may be formed on or in a glass, plastic or silicon substrate.

Figure 9:
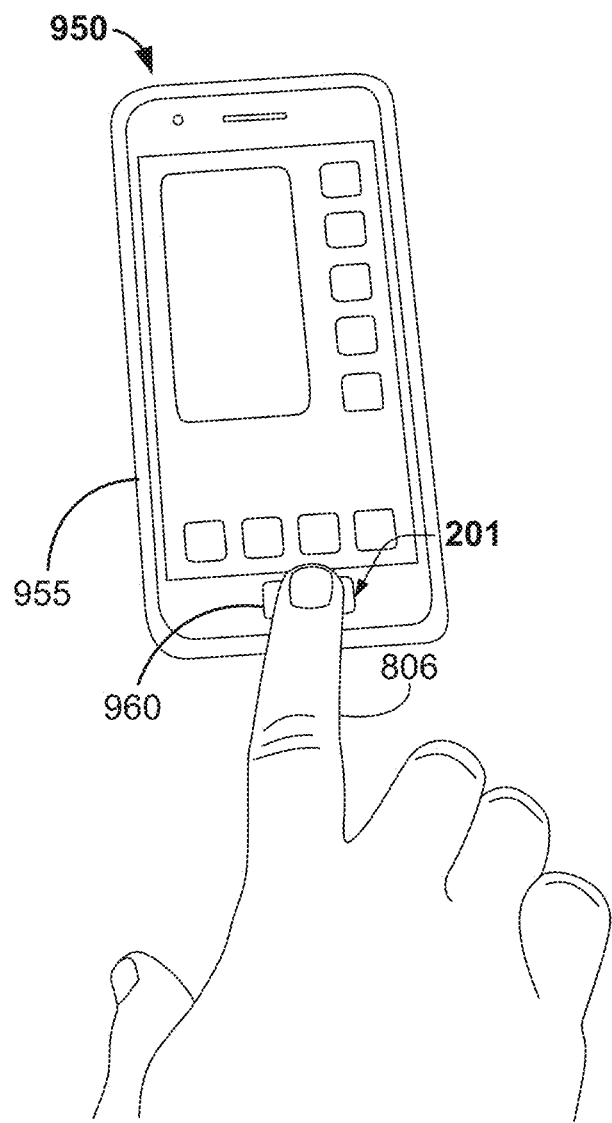
FIG. 9 shows an example of a mobile device that includes a biometric system as disclosed herein.

FIG. 9 shows an example of a mobile device that includes a biometric system as disclosed herein. In this example, the mobile device 950 is a smartphone. However, in alternative examples the mobile device 950 may another type of mobile device, such as a mobile health device, such as a mobile drug delivery device, a wearable device, a tablet computer, etc.

In this example, the mobile device 950 includes an instance of the apparatus 201 that is described above with reference to FIG. 2. In this example, the apparatus 201 is disposed, at least in part, within the mobile device enclosure 955. According to this example, at least a portion of the apparatus 201 is located in the portion of the mobile device 950 that is shown being touched by the finger 806, which corresponds to the location of button 960. Accordingly, the button 960 may be an ultrasonic button. In some implementations, the button 960 may serve as a home button. In some implementations, the button 960 may serve as an ultrasonic authenticating button, with the ability to turn on or otherwise wake up the mobile device 950 when touched or pressed and/or to authenticate or otherwise validate a user when applications running on the mobile device (such as a wake-up function) warrant such a function.

In this implementation, the mobile device 950 may be capable of performing a user authentication process. For example, a control system of the mobile device 950 may be capable of comparing attribute information obtained from image data received via an ultrasonic sensor array of the apparatus 901 with stored attribute information obtained from image data that has previously been received from an authorized user. In some examples, the attribute information obtained from the received image data and the stored attribute information may include attribute information corresponding to at least one of sub-epidermal features, muscle tissue features or bone tissue features.

According to some implementations, the attribute information obtained from the received image data and the stored attribute information may include information regarding fingerprint minutia or keypoints. In some such implementations, the user authentication process may involve evaluating information regarding the fingerprint minutia as well as at least one other type of attribute information, such as attribute information corresponding to sub-epidermal features. According to some such examples, the user authentication process may involve evaluating information regarding the fingerprint minutia or keypoints as well as attribute information corresponding to vascular features. For example, attribute information obtained from a received image of blood vessels in the finger may be compared with a stored image of blood vessels in the authorized user's finger 806.

Figure 10:
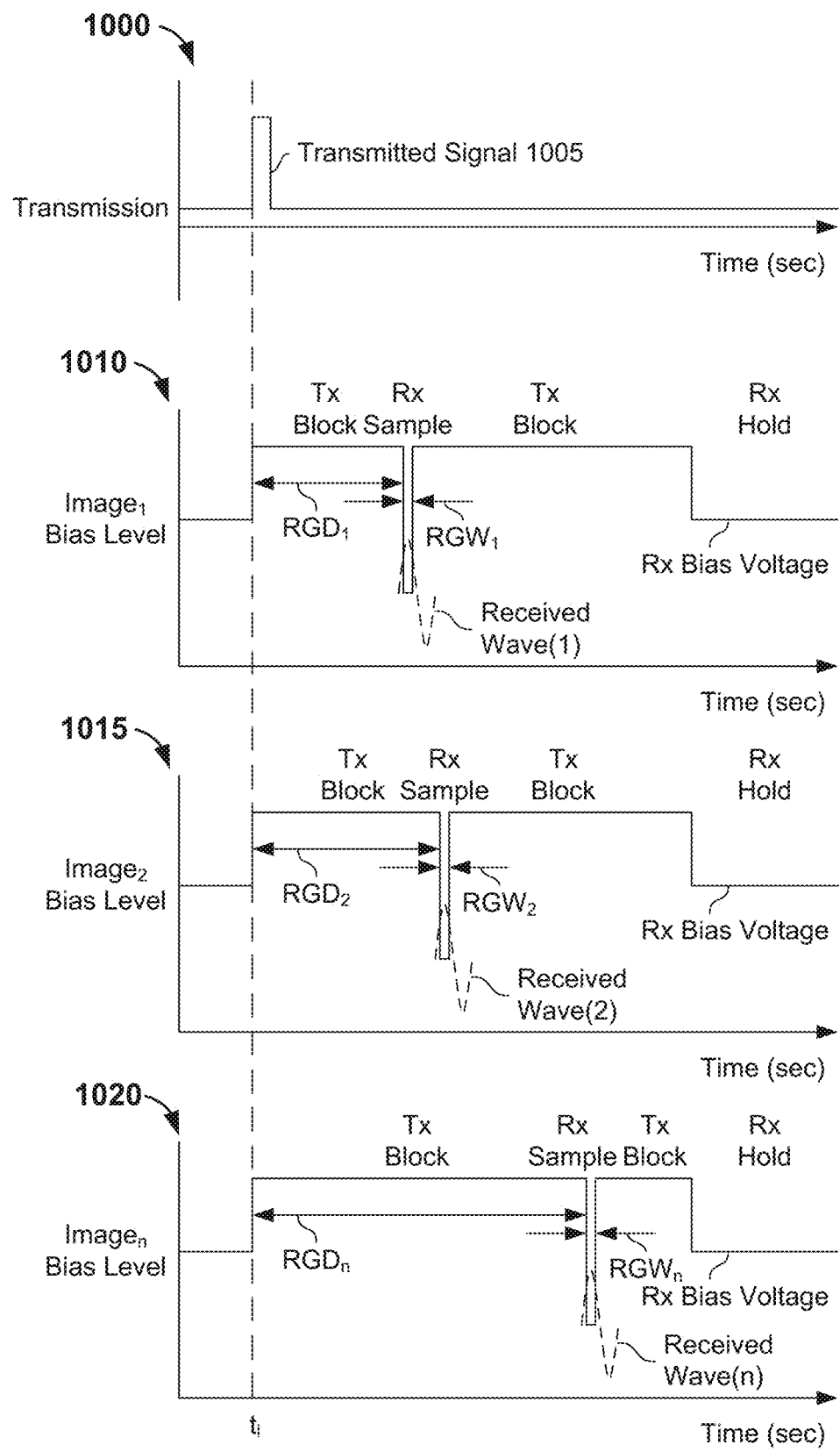
FIG. 10 shows examples of multiple acquisition time delays being selected to receive acoustic waves reflected from different depths.

FIG. 10 shows examples of multiple acquisition time delays being selected to receive acoustic waves reflected from different depths. In these examples, each of the acquisition time delays (which are labeled range-gate delays or RGDs in FIG. 10) is measured from the beginning time $t_1$ of the transmitted signal 1005 shown in graph 1000. The graph 1010 depicts reflected acoustic waves (received wave (1) is one example) that may be received by an ultrasonic sensor array at an acquisition time delay $RGD_1$ and sampled during an acquisition time window of $RGW_1$. Such acoustic waves will generally be reflected from a relatively shallower portion of a target object proximate, or positioned upon, a platen of the biometric system.

Graph 1015 depicts reflected acoustic waves (received wave (2) is one example) that are received by at least a portion of the ultrasonic sensor array at an acquisition time delay $RGD_2$ (with $RGD_2 > RGD_1$) and sampled during an acquisition time window of $RGW_2$. Such acoustic waves will generally be reflected from a relatively deeper portion of the target object. Graph 1020 depicts reflected acoustic waves (received wave (n) is one example) that are received at an acquisition time delay $RGD_n$ (with $RGD_n > RGD_2 > RGD_1$) and sampled during an acquisition time window of $RGW_n$. Such acoustic waves will generally be reflected from a still deeper portion of the target object.

Range-gate delays are typically integer multiples of a clock period. A clock frequency of 128 MHz, for example, has a clock period of 7.8125 nanoseconds, and RGDs may range from under 10 nanoseconds to over 20,000 nanoseconds.

Similarly, the range-gate windows may also be integer multiples of the clock period, but are often much shorter than the RGD (e.g. less than about 50 nanoseconds) to capture returning signals while retaining good axial resolution. In some implementations, the acquisition time window (RGW) may be between about 10 nanoseconds to about 200 nanoseconds. In some examples, the RGW may be less than 10 nanoseconds, e.g., 5 nanoseconds, 6 nanoseconds, 7 nanoseconds or 8 nanoseconds. Such implementations may be advantageous for acquiring ultrasonic data for a 3D image, e.g., for a 3D fingerprint image. However, in some examples the RGW may be more than 200 nanoseconds.

Extending the duration of the range-gate width while keeping the RGD constant allows the sensor pixel circuits to capture the peak value of the reflected ultrasonic waves corresponding to the fingerprint ridges and valleys and to sub-epidermal features that may be captured during the time that the RGW is active. Increasing the RGD allows imaging of sub-epidermal features deeper into the finger.

Note that while various image bias levels (e.g. Tx block, Rx sample and Rx hold that may be applied to an Rx bias electrode) may be in the single or low double-digit volt range, the return signals may have voltages in the tens or hundreds of millivolts. In some implementations, the receiver bias control signal having two or more levels representing the selected RGD and RGW may be applied to the receiver bias electrode of the ultrasonic sensor array. In some implementations, a diode bias control signal applied to the sensor pixel circuits within the ultrasonic sensor array may contain two or more levels representing the selected RGD and RGW. In some implementations, a portion of the sensor pixel circuits, such as a block, line or sub-array of pixels, may be used to acquire one or more images in a sub-surface region of the target object at the desired depth and position to increase the frame rate and reduce the image processing requirements.

Figure 11:
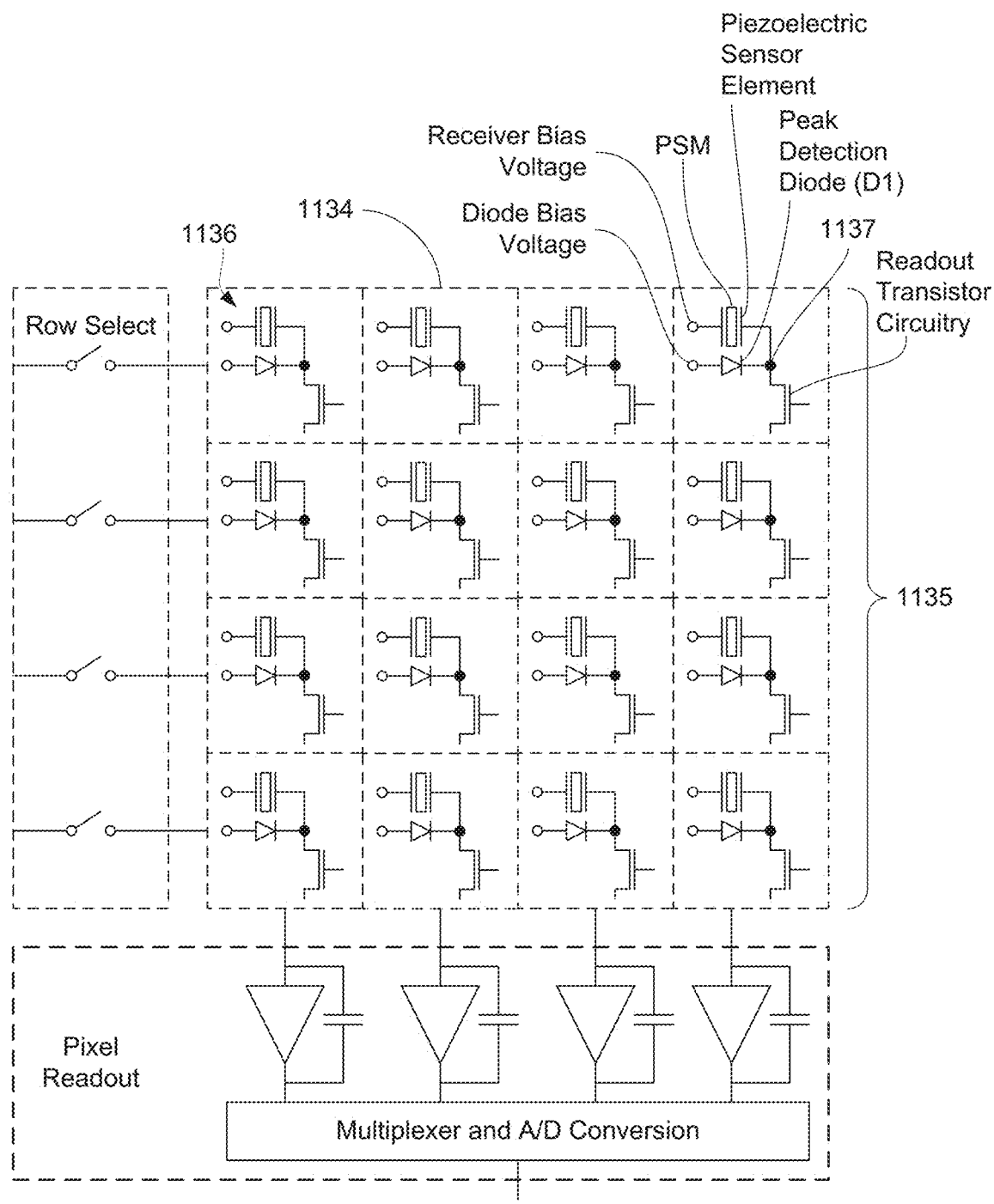
FIG. 11 representationally depicts aspects of a 4×4 pixel array of sensor pixels for an ultrasonic sensor system.

FIG. 11 representationally depicts aspects of a 4×4 pixel array of sensor pixels for an ultrasonic sensor system. Each pixel 1134 may be, for example, associated with a local region of piezoelectric sensor material (PSM), a peak detection diode (D1) and a readout transistor (M3); many or all of these elements may be formed on or in a substrate to form the pixel circuit 1136. In practice, the local region of piezoelectric sensor material of each pixel 1134 may transduce received ultrasonic energy into electrical charges. The peak detection diode D1 may register the maximum amount of charge detected by the local region of piezoelectric sensor material PSM. Each row of the pixel array 1135 may then be scanned, e.g., through a row select mechanism, a gate driver, or a shift register, and the readout transistor M3 for each column may be triggered to allow the magnitude of the peak charge for each pixel 1134 to be read by additional circuitry, e.g., a multiplexer and an A/D converter. The pixel circuit 1136 may include one or more TFTs to allow gating, addressing, and resetting of the pixel 1134.

Each pixel circuit 1136 may provide information about a small portion of the object detected by the ultrasonic sensor system. While, for convenience of illustration, the example shown in FIG. 11 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the target object.

Figure 12A:
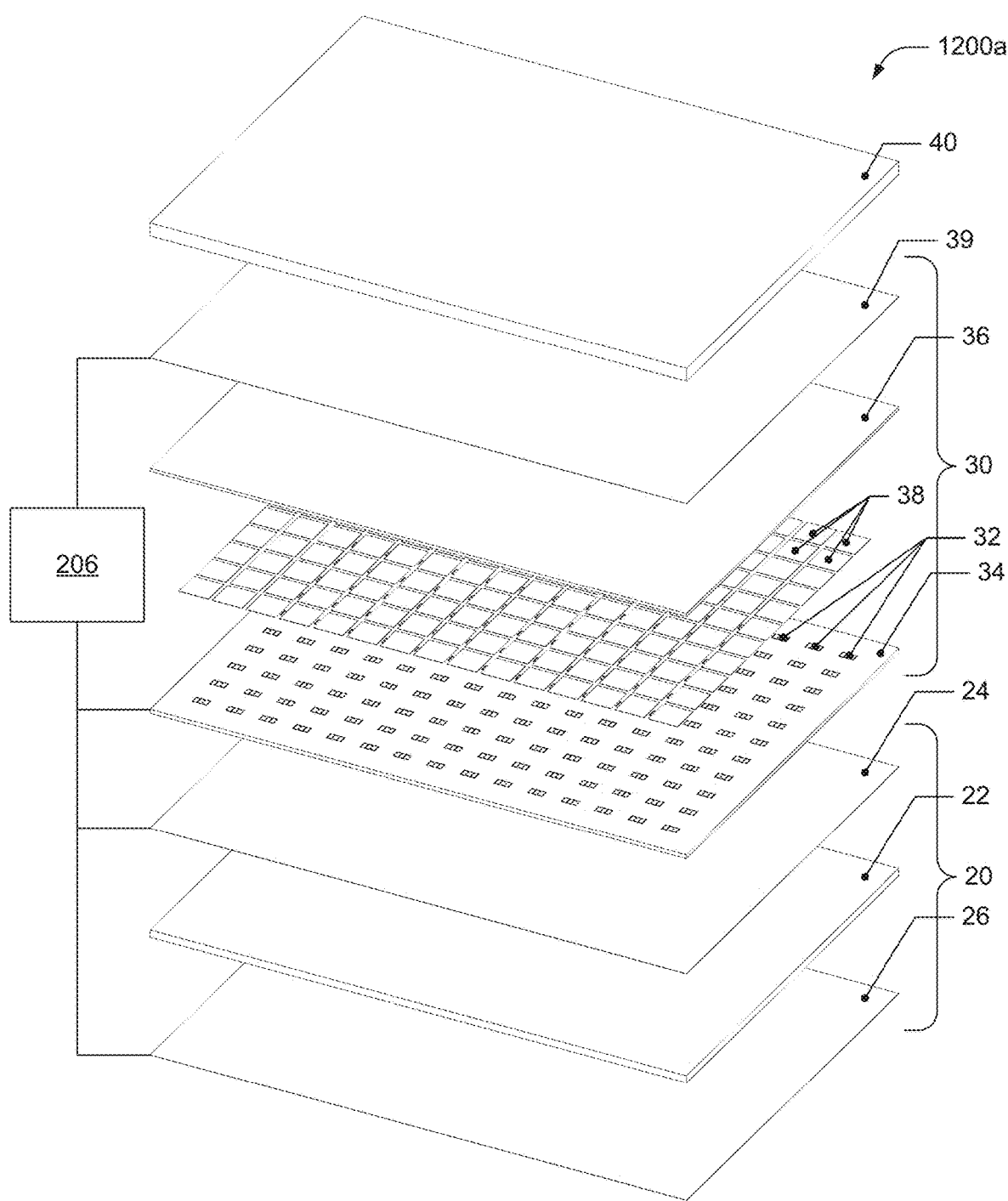
FIG. 12A shows an example of an exploded view of an ultrasonic sensor system.

FIG. 12A shows an example of an exploded view of an ultrasonic sensor system. In this example, the ultrasonic sensor system 1200 a includes an ultrasonic transmitter 20 and an ultrasonic receiver 30 under a platen 40. According to some implementations, the ultrasonic receiver 30 may be an example of the ultrasonic sensor array 832 that is shown in FIG. 8 and described above. In some implementations, the ultrasonic transmitter 20 may be an example of the ultrasonic transmitter 808 that is shown in FIG. 8 and described above. The ultrasonic transmitter 20 may include a substantially planar piezoelectric transmitter layer 22 and may be capable of functioning as a plane wave generator. Ultrasonic waves may be generated by applying a voltage to the piezoelectric layer to expand or contract the layer, depending upon the signal applied, thereby generating a plane wave. in this example, the control system 206 may be capable of causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This ultrasonic wave may travel towards a finger (or other object to be detected), passing through the platen 40. A portion of the wave not absorbed or transmitted by the object to be detected may be reflected so as to pass back through the platen 40 and be received by at least a portion of the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT elements, electrical interconnect traces and, in some implementations, one or more additional circuit elements such as diodes, capacitors, and the like. Each sensor pixel circuit 32 may be configured to convert an electric charge generated in the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into localized electrical charges by the piezoelectric receiver layer 36. These localized charges may be collected by the pixel input electrodes 38 and passed on to the underlying sensor pixel circuits 32. The charges may be amplified or buffered by the sensor pixel circuits 32 and provided to the control system 206.

The control system 206 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 206 may operate substantially as described above. For example, the control system 206 may be capable of processing the amplified signals received from the sensor pixel circuits 32.

The control system 206 may be capable of controlling the ultrasonic transmitter 20 and/or the ultrasonic receiver 30 to obtain ultrasonic image data, e.g., by obtaining fingerprint images. Whether or not the ultrasonic sensor system 1200a includes an ultrasonic transmitter 20, the control system 206 may be capable of obtaining attribute information from the ultrasonic image data. In some examples, the control system 206 may be capable of controlling access to one or more devices based, at least in part, on the attribute information. The ultrasonic sensor system 1200a (or an associated device) may include a memory system that includes one or more memory devices. In some implementations, the control system 206 may include at least a portion of the memory system. The control system 206 may be capable of obtaining attribute information from ultrasonic image data and storing the attribute information in the memory system. In some implementations, the control system 206 may be capable of capturing a fingerprint image, obtaining attribute information from the fingerprint image and storing attribute information obtained from the fingerprint image (which may be referred to herein as fingerprint image information) in the memory system. According to some examples, the control system 206 may be capable of capturing a fingerprint image, obtaining attribute information from the fingerprint image and storing attribute information obtained from the fingerprint image even while maintaining the ultrasonic transmitter 20 in an "off" state.

In some implementations, the control system 206 may be capable of operating the ultrasonic sensor system 1200a in an ultrasonic imaging mode or a force-sensing mode. In some implementations, the control system may be capable of maintaining the ultrasonic transmitter 20 in an "off" state when operating the ultrasonic sensor system in a force-sensing mode. The ultrasonic receiver 30 may be capable of functioning as a force sensor when the ultrasonic sensor system 1200a is operating in the force-sensing mode. In some implementations, the control system 206 may be capable of controlling other devices, such as a display system, a communication system, etc. In some implementations, the control system 206 may be capable of operating the ultrasonic sensor system 1200a in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is capable of imaging fingerprints in a force detection mode or a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 µm thick and a PVDF-TrFE receiver layer 36 is approximately 12 µm thick. Example frequencies of the ultrasonic waves may be in the range of 5 MHz to 30 MHz, with wavelengths on the order of a millimeter or less.

Figure 12B:
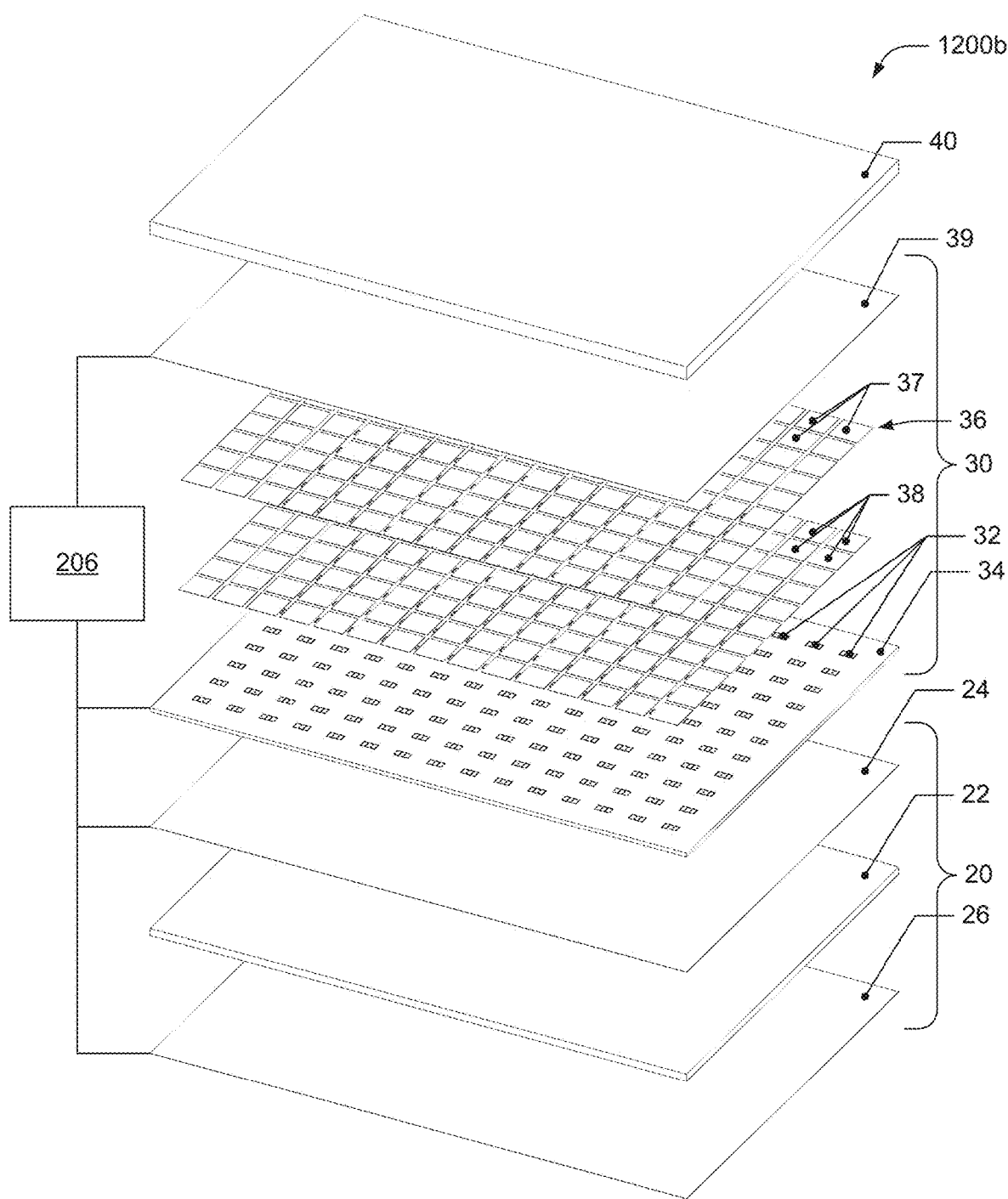
FIG. 12B shows an exploded view of an alternative example of an ultrasonic sensor system.

FIG. 12B shows an exploded view of an alternative example of an ultrasonic sensor system. In this example, the piezoelectric receiver layer 36 has been formed into discrete elements 37. In the implementation shown in FIG. 12B, each of the discrete elements 37 corresponds with a single pixel input electrode 38 and a single sensor pixel circuit 32. However, in alternative implementations of the ultrasonic sensor system 1200b, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 12A and 12B show example arrangements of ultrasonic transmitters and receivers in an ultrasonic sensor system, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor array (e.g., a single-layer transmitter and receiver). In some implementations, the ultrasonic sensor system may include an acoustic delay layer. For example, an acoustic delay layer may be incorporated into the ultrasonic sensor system between the ultrasonic transmitter 20 and the ultrasonic receiver 30. An acoustic delay layer may be employed to adjust the ultrasonic puke timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic sensor system is arriving at the ultrasonic receiver 30. In some implementations, the substrate 34 and/or the platen 40 may serve as an acoustic delay layer.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus, comprising:
  an ultrasonic fingerprint sensor system; and
  a control system configured for:
    obtaining, via a scan of the fingerprint sensor system, current fingerprint image data from a surface of a target object positioned on or near the fingerprint sensor system;
    extracting current fingerprint features from the current fingerprint image data;
    obtaining, from a memory system, a previously-acquired fingerprint enrollment template;
    determining whether the current fingerprint features match features of the previously-acquired fingerprint enrollment template; and, if the control system determines that the current fingerprint features match features of the previously-acquired fingerprint enrollment template:
      obtaining, via one or more additional scans of the fingerprint sensor system, current subsurface image data from a subsurface of the target object;
      calculating an estimated biometric age of the target object, based at least in part on the current subsurface image data;
      obtaining, from the memory system, a previously-estimated biometric age; and
      determining whether the estimated biometric age of the target object matches the previously-estimated biometric age.

2. The apparatus of claim 1, wherein calculating the estimated biometric age involves calculating one or more metrics selected from a group of metrics consisting of finger size, fingerprint line density, heart rate, respiration rate and arterial stiffness.

3. The apparatus of claim 1, wherein calculating the estimated biometric age involves calculating one or more arterial pulse waveform parameters.

4. The apparatus of claim 3, wherein calculating the estimated biometric age involves calculating a time interval between a systolic peak and a diastolic peak.

5. The apparatus of claim 3, wherein calculating the estimated biometric age involves calculating an arterial stiffness parameter.

6. The apparatus of claim 3, wherein calculating the estimated biometric age involves calculating a second derivative of an arterial pulse waveform.

7. The apparatus of claim 6, wherein calculating the estimated biometric age involves calculating a ratio of features that are determined from the second derivative of the arterial pulse waveform.

8. The apparatus of claim 1, wherein calculating the estimated biometric age involves calculating an estimated biometric age range.

9. The apparatus of claim 1, wherein calculating the estimated biometric age involves calculating a composite score based on multiple parameters.

10. The apparatus of claim 1, wherein the control system is configured for controlling access to a device according to whether the current fingerprint features match features of the previously-acquired fingerprint enrollment template and whether the estimated biometric age of the target object matches the previously-estimated biometric age.

11. The apparatus of claim 1, wherein the control system is configured for controlling access to at least one website or at least one software application according to whether the current fingerprint features match features of the previously-acquired fingerprint enrollment template and whether the estimated biometric age of the target object matches the previously-estimated biometric age.

12. An authentication method, comprising:
  obtaining, via a scan of a fingerprint sensor system, current fingerprint image data from a surface of a target object positioned on or near the fingerprint sensor system;
  extracting current fingerprint features from the current fingerprint image data;
  obtaining, from a memory system, a previously-acquired fingerprint enrollment template;

determining, by a control system, whether the current fingerprint features match features of the previously-acquired fingerprint enrollment template; and, if the control system determines that the current fingerprint features match features of the previously-acquired fingerprint enrollment template:
  obtaining, via one or more additional scans of the fingerprint sensor system, current subsurface image data from a subsurface of the target object;
  calculating an estimated biometric age of the target object, based at least in part on the current subsurface image data;
  obtaining, from the memory system, a previously-estimated biometric age; and
  determining whether the estimated biometric age of the target object matches the previously-estimated biometric age.

13. The method of claim 12, wherein calculating the estimated biometric age involves calculating one or more metrics selected from a group of metrics consisting of finger size, fingerprint line density, heart rate, respiration rate and arterial stiffness.

14. The method of claim 12, wherein calculating the estimated biometric age involves calculating one or more arterial pulse waveform parameters.

15. The method of claim 14, wherein calculating the estimated biometric age involves calculating a time interval between a systolic peak and a diastolic peak.

16. The method of claim 14, wherein calculating the estimated biometric age involves calculating an arterial stiffness parameter.

17. The method of claim 14, wherein calculating the estimated biometric age involves calculating a second derivative of an arterial pulse waveform.

18. The method of claim 17, wherein calculating the estimated biometric age involves calculating a ratio of features that are determined from the second derivative of the arterial pulse waveform.

19. The method of claim 12, wherein calculating the estimated biometric age involves calculating an estimated biometric age range.

20. The method of claim 12, wherein calculating the estimated biometric age involves calculating a composite score based on multiple parameters.

21. The method of claim 12, further comprising controlling access to a device according to whether the current fingerprint features match features of the previously-acquired fingerprint enrollment template and whether the estimated biometric age of the target object matches the previously-estimated biometric age.

22. The method of claim 12, further comprising controlling access to at least one website or at least one software application according to whether the current fingerprint features match features of the previously-acquired fingerprint enrollment template and whether the estimated biometric age of the target object matches the previously-estimated biometric age.

23. One or more non-transitory media having software stored thereon, the software including instructions for controlling one or more devices to perform an authentication method that comprises:
  obtaining, via a scan of a fingerprint sensor system, current fingerprint image data from a surface of a target object positioned on or near the fingerprint sensor system;
  extracting current fingerprint features from the current fingerprint image data;
  obtaining, from a memory system, a previously-acquired fingerprint enrollment template;
  determining, by a control system, whether the current fingerprint features match features of the previously-acquired fingerprint enrollment template; and, if the control system determines that the current fingerprint features match features of the previously-acquired fingerprint enrollment template:
    obtaining, via one or more additional scans of the fingerprint sensor system, current subsurface image data from a subsurface of the target object;
    calculating an estimated biometric age of the target object, based at least in part on the current subsurface image data;
    obtaining, from the memory system, a previously-estimated biometric age; and
    determining whether the estimated biometric age of the target object matches the previously-estimated biometric age.

24. The one or more non-transitory media of claim 23, wherein calculating the estimated biometric age involves calculating one or more metrics selected from a group of metrics consisting of finger size, fingerprint line density, heart rate, respiration rate and arterial stiffness.

25. The one or more non-transitory media of claim 23, wherein calculating the estimated biometric age involves calculating one or more arterial pulse waveform parameters.

26. The one or more non-transitory media of claim 25, wherein calculating the estimated biometric age involves calculating a time interval between a systolic peak and a diastolic peak.

27. The one or more non-transitory media of claim 23, wherein calculating the estimated biometric age involves calculating an estimated biometric age range.

28. An apparatus, comprising:
  an ultrasonic fingerprint sensor system; and
  control means for:
    obtaining, via a scan of the fingerprint sensor system, current fingerprint image data from a surface of a target object positioned on or near the fingerprint sensor system;
    extracting current fingerprint features from the current fingerprint image data;
    obtaining, from a memory system, a previously-acquired fingerprint enrollment template;
    determining whether the current fingerprint features match features of the previously-acquired fingerprint enrollment template; and, if the control system determines that the current fingerprint features match features of the previously-acquired fingerprint enrollment template:
      obtaining, via one or more additional scans of the fingerprint sensor system, current subsurface image data from a subsurface of the target object;
      calculating an estimated biometric age of the target object, based at least in part on the current subsurface image data;
      obtaining, from the memory system, a previously-estimated biometric age; and
      determining whether the estimated biometric age of the target object matches the previously-estimated biometric age.

29. The apparatus of claim 28, wherein calculating the estimated biometric age involves calculating one or more metrics selected from a group of metrics consisting of finger size, fingerprint line density, heart rate, respiration rate and arterial stiffness.

30. The apparatus of claim 28, wherein calculating the estimated biometric age involves calculating one or more arterial pulse waveform parameters.

* * * * *